Oct. 23, 1951  A. F. FOLZ  2,572,021
BEARING SURFACE
Filed Jan. 16, 1946

Inventor
ARTHUR F. FOLZ
By
Attorney

Patented Oct. 23, 1951

2,572,021

UNITED STATES PATENT OFFICE 2,572,021

BEARING SURFACE

Arthur F. Folz, United States Navy

Application January 16, 1946, Serial No. 641,547

4 Claims. (Cl. 308—237)

(Granted under the act of March 3, 1883, as amended April 30, 1928; 370 O. G. 757)

This invention relates to an improvement in bearing surfaces, and, in particular, to a grooved bearing surface adapted to receive and dispense a liquid lubricant between two relatively moving frictionally engaged parts such as a piston reciprocating within a cylinder or a journal rotating within its supporting bearing.

Heretofore, various and sundry difficulties have been experienced in maintaining bearings within safe operating temperatures by reason of the fact that the relative speeds of the frictionally engaged parts have been so high that the supply of lubricant maintained therebetween is inadequate to provide proper lubrication. Particularly, when a piston is caused to reciprocate within its cylinder from the standing to the running condition, the initial supply of lubricant is usually of an insufficient quantity to avoid direct metal to metal contact of reciprocating surfaces. This is true where the reciprocating parts have been stationary for a considerable length of time, thus permitting the oil to drain into the sump or the like, causing the surfaces of the piston and cylinder to become dry.

It is one object of this invention, therefore, to provide a bearing which will insure proper lubrication between relatively moving bearing parts under all conditions of operation.

Another object of the invention is to provide a low friction, economically operable bearing which is relatively simple to manufacture and assemble.

It is a further object of this invention to provide a bearing surface having long wearing qualities, thus insuring long life and relatively little servicing.

These objects, as well as the various other novel features and advantages of this invention, will become apparent from a reading of the specification and accompanying drawings of which:

Figure 1:
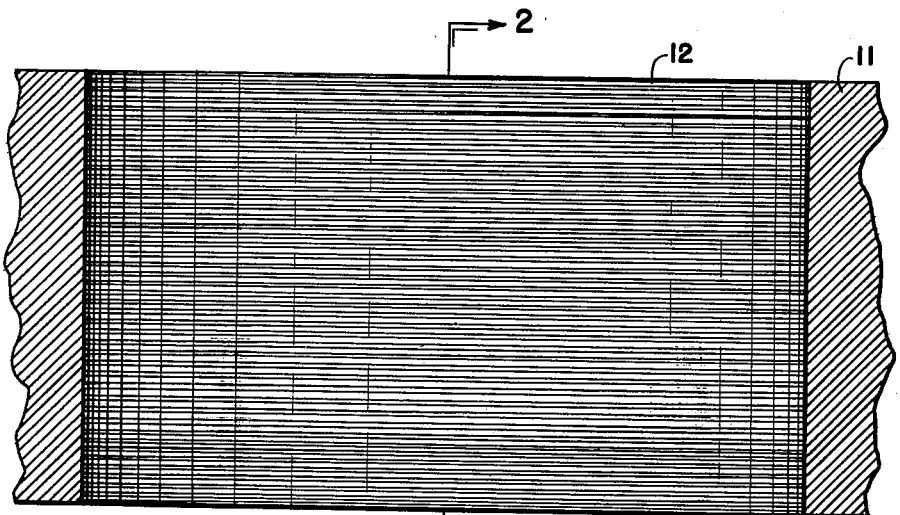
Figure 1 is a cross-sectional elevational view of a journal bearing or a sectional-elevational view of a part of an internal combustion engine cylinder embodying the features of this invention, showing a plurality of liquid lubricant receiving and dispensing grooves extending across the face thereof.
Figure 2:
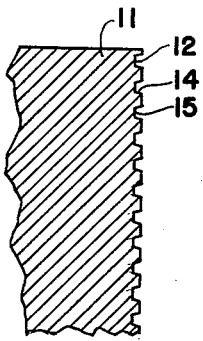
Figure 2 is a sectional view taken at 2—2 of Figure 1, in which is shown the cross-sectional shape of the grooves formed in the bearing face.
Figure 4:
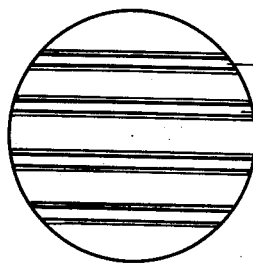
Figure 3:
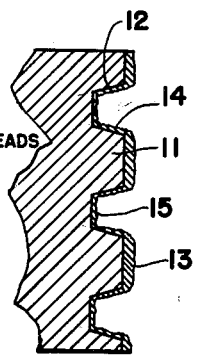

Figure 3 is an enlarged view similar to that of Figure 2 but in which is shown a bearing surface, grooved in accordance with this invention, and to which a coating of metal, such as chromium, has been added by any well-known electrolytic deposition process; and Figure 4 is an enlarged plan view of a small portion of the bearing surface of Figure 1, indicating the relative spacing between the grooves and the actual load-supporting surface of the bearing.

With reference to Figures 1, 2 and 3, the bearing surface disclosed therein comprises a base 11, into which a plurality of threads or grooves 12 have been cut by means of a thread grinding or thread cutting tool, and to which a coating 13 of chromium or the like has been applied by means of an electrolytic process.

With respect to the threads or grooves 12, it has been found that depending upon the type of service to which the bearing manufactured in accordance with this invention is to be subjected, the pitch thereof may be selected from within the range of about 20 to 100 threads per inch. Although the depth and width of groove may be varied to suit various conditions of operation to which the bearing will ultimately be subjected, it has been determined that a width of groove of approximately .005 of an inch having relatively vertical side portions 14 and a depth of approximately .004 of an inch will give very satisfactory results. These dimensions are obviously such as produce capillarity in the grooves when liquids are brought into contact with the bearing surface whereby the liquid is retained on the surface over substantial time periods.

By reason of the application of the electrolytically deposited metal coating 13 in accordance with Figure 3, the depth of thread or groove 12 will be relatively deeper than it was prior to coating inasmuch as the metal supplied by the electrolytic process is much more freely received on the bearing surface which is to support the load than it is at the sides 14 or bottom 15 of the grooves. Thus, not only does the coating provide a much better wear resistant surface, but by having a relatively deeper liquid lubricant receiving and dispensing groove, any wear which may take place will have very little influence upon the effect of thread or groove depth.

Although, as illustrated, an electrolytically deposited chromium coating on the surface of the bearing has, by experiment, shown marked improvement over conventional chromium coated bearings, by other tests, it has been determined that a highly polished bearing surface consisting of the base metal into which a plurality of liquid lubricant receiving and dispensing threads or grooves have been formed will give very satisfactory results under certain running conditions. Not only is frictional wear reduced to a minimum through use of the bearing surface embodying the features of the invention disclosed herein, but much better operation of relatively moving contacting elements is insured.

It will be understood that the above description and accompanying drawings comprehend only the general and preferred embodiment of this invention and that various changes in construction and proportion as well as arrangement of the grooves or depressions may be made within the scope of the appended claims without sacrificing any of the advantages of the invention.

The invention described herein may be manufactured and used by or for the Government of the United States of America for governmental purposes without the payment of any royalties thereon or therefor.

What is claimed is:

1. A bearing comprising a load supporting base having a uniformly one-way grooved bearing surface, and a coating of bearing metal on said surface, the grooves of said surface having a width of approximately 0.005 inch and a depth of approximately 0.004 inch.

2. A bearing comprising a load supporting base having a grooved bearing surface and an electrolytic coating of bearing metal on said surface, said grooves being of such dimensions as to width and depth as to exert a capillary attractive force on lubricating oil.

3. A bearing comprising a load supporting base having a finely grooved bearing surface wherein each groove is of such dimensions with respect to width and depth as to exert a capillary attractive force on lubricating oil, and a coating of hard bearing metal on said surface, said coating being thicker on the bearing faces of the surface lands than in said grooves.

4. A cylinder for an internal combustion engine comprising a cylinder sidewall provided with a relatively smooth surface toward the interior of said cylinder, thread grooves helically cut in said surface at a pitch within the range of from 20 to 100 threads per inch to divide said surface into lands and grooves, said grooves having a width of about 0.005 inch and a depth of about 0.004 inch and a coating of electrolytically deposited chromium on said surface and in said grooves, said coating being thicker on the surface of said lands than in said grooves and said coated grooves characterized, by reason of their width and depth dimensions, by the ability to capillarily attract and retain lubricating oil therein.

ARTHUR F. FOLZ.

REFERENCES CITED

The following references are of record in the file of this patent:

UNITED STATES PATENTS

| Number | Name | Date |
|---|---|---|
| 1,184,406 | Bache | May 23, 1916 |
| 1,600,961 | Payne | Sept. 21, 1926 |
| 1,847,524 | Dezendorf | Mar. 1, 1932 |
| 1,877,495 | Cater | Sept. 13, 1932 |
| 1,961,029 | Benedek | May 29, 1934 |
| 2,248,530 | Granger et al. | July 8, 1941 |
| 2,433,457 | Jarrett et al. | Dec. 30, 1947 |

FOREIGN PATENTS

| Number | Country | Date |
|---|---|---|
| 339,649 | Germany | July 30, 1921 |